March 15, 1927. 1,621,354
C. A. DAWLEY
PULSATION COMPENSATED METER
Filed Dec. 21, 1921   2 Sheets-Sheet 1
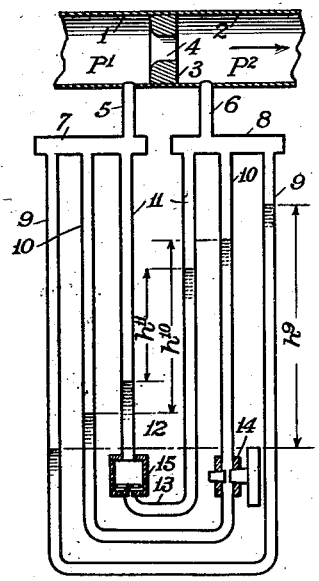
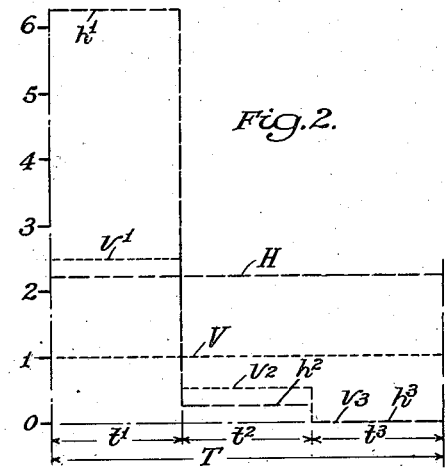
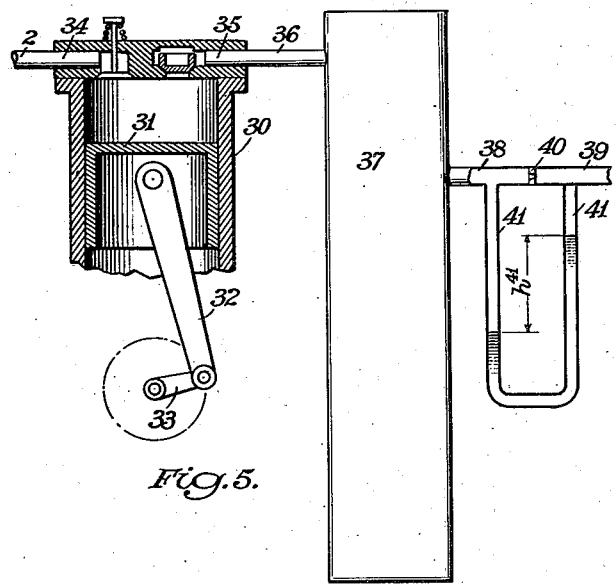
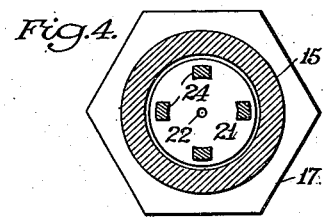
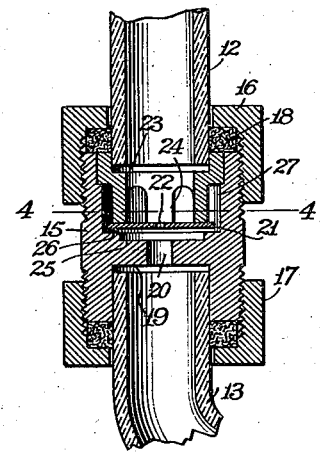
INVENTOR
CLARENCE A. DAWLEY
BY
ATTORNEYS March 15, 1927.
C. A. DAWLEY
1,621,354
PULSATION COMPENSATED METER
Filed Dec. 21, 1921   2 Sheets-Sheet 2
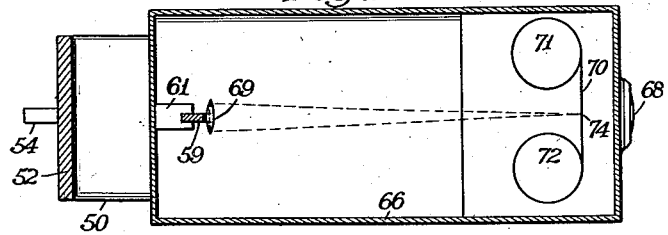
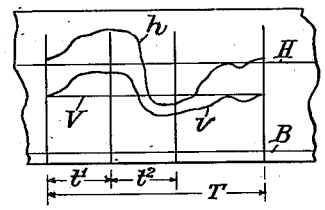
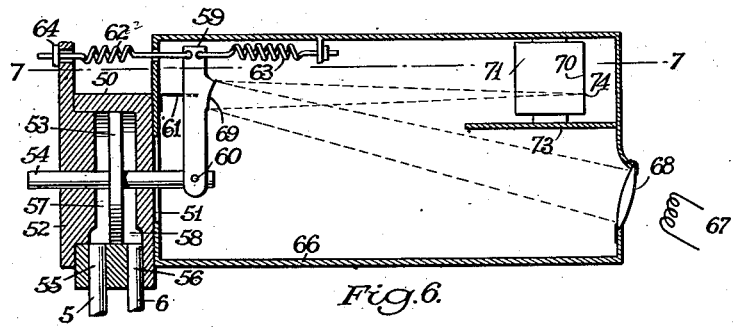
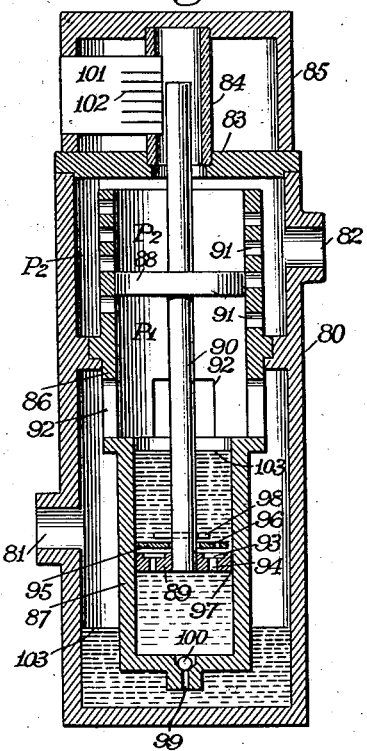
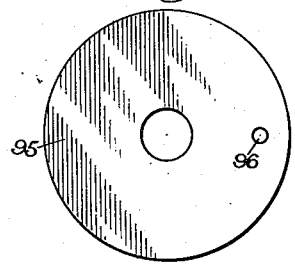
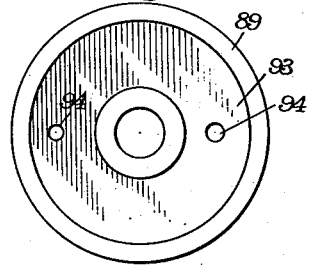
INVENTOR
CLARENCE A. DAWLEY
BY
ATTORNEYS Patented Mar. 15, 1927.

1,621,354

UNITED STATES PATENT OFFICE.

CLARENCE A. DAWLEY, OF PLAINFIELD, NEW JERSEY.

PULSATION COMPENSATED METER.

Application filed December 21, 1921. Serial No. 523,902.

My invention relates to a method of and apparatus for measuring pulsating flow, and comprises the determination of the effect of such pulsating flow on well known types of flow meters, and the correction or compensation of such meters so that they will give automatically correct readings when used on pulsating flow, without affecting their accuracy when used on constant or steady flow.

The term "pulsating flow" as commonly employed, and as used in this specification, denotes the instantaneous variation in velocity or volume of the fluid or liquid passing through a pipe, such variation being usually periodic and recurring; as, for example, the flow of steam to a reciprocating engine, which varies widely during a cycle or period consisting of one revolution of the crank shaft.

Another form of pulsation often accompanying an instantaneously variable velocity of flow, is the pulsation in the pressure of a fluid due to the non-uniform rate of supply or discharge from the pipe. The terms "pulsation" and "pulsating flow" as here used will be understood, however to refer only to the velocity or volume flowing.

My invention applies to meters of the Venturi, Pitot, flow nozzle, and disc orifice types, also to variable area meters such as the St. John steam meter and the New Jersey Meter Co. "Tool-Om-Eter" type. All of these meters are based upon a determination of the velocity of the fluid by means of the "head" or differential pressures at certain points in the flow stream. The fundamental formula of these meters is $$V = \sqrt{2gh}$$

in which $v$ is the velocity in feet per second, of the fluid, $2g$ is a constant, and $h$ is the head expressed in suitable units. From this formula it is evident that the velocity varies as the square root of the head, or that the head varies as the square of the velocity.

The term "flow meter", as used in this specification and claims has the meaning commonly employed in engineering literature and commercial usage. It contemplates a device for determining the rate of flow of a fluid in a conduit, the flow not being actually measured by volumetric or gravimetric methods, but calculated by known laws governing the velocity, density, area of flow stream and the differential head established by the flow. The differential head may be produced by any of the well known methods, such as the Pitot tube, Venturi tube, or restricted orifice in the flow stream. The head may be observed by means of a manometer showing the head as the difference of two liquid levels, a mercury well having a metal float actuated by the differential head, or a piston of known area actuated by the head and opposed by a weight or spring. A flow meter is an inferential meter in which volume or weight of fluid flowing is deduced from known differential head, density of fluid and area of flow stream.

From the velocity and area of the flow stream, the volume or weight may be determined, and the readings of the meter can be given in suitable units, such as "cubic feet per minute" or "pounds per hour", etc.

It is a well recognized fact by those skilled in the art of metering that while head meters may be made to give very accurate results on a steady, non-pulsating, flow, they do not give correct results when applied to instantaneously varying or pulsating flow. Thus, Mr. Francis P. Fisher, who has conducted exhaustive tests in the measurement of natural gas flow, states in a paper before the American Society of Mechanical Engineers at convention in New Orleans, April 1916,—"One problem that remains unsolved is obtaining correct measurement with a pulsating flow. After many unsuccessful attempts to solve the problem of measuring under these conditions, our efforts are now bent on eliminating pulsation."

Professor Thomas G. Estep, Jr., of the Carnegie Institute of Technology states in an article in the "Iron Age", November 9, 1916,—"The flow through the orifice must be constant; if it is pulsating or fluctuating a large error will result."

Mr. E. G. Bailey, president of the Bailey Water Co., states (A. S. M. E. Journal, October, 1916) "Regardless of the use of cams, special-shaped bells, displacing members, or any other mechanism, whereby a motion is produced in direct proportion to the rate of flow for continuous flow, they cannot possibly produce an average reading that is directly proportional to the rate of flow in the case of pulsatng flow."

While the above opinions are correct with respect to meters now in general use, my investigations of the effect of pulsation on head meters have resulted in an analysis of these effects, and in the provision of means by which the meters may be made to read correctly for pulsating flow.

In the accompanying drawings—

Figure 1 is a side elevation of a diagrammatic installation to illustrate the invention;

Fig. 2 is an illustrative chart;

Fig. 3 is a vertical section through a valve which may be used in a meter embodying my invention;

Fig. 4 is a section on the line 4—4, Fig. 3;

Fig. 5 is a broken side elevation of a further illustrative installation;

Fig. 6 is a more or less diagrammatic side elevation partially in section, of an apparatus for indicating pulsations;

Fig. 7 is a plan thereof;

Fig. 8 is a pulsation chart;

Fig. 9 is a vertical section through a meter having an associated dash-pot to which the present invention is applied;

Fig. 10 is a plan view of the dash-pot piston valve disc 95 drawn to a larger scale;

Fig. 11 is a plan of the dash-pot piston drawn to a larger scale; and

Fig. 12 is a diametrical section therethrough.

Referring to the drawings, Fig. 1 shows diagrammatically a simple form of flow meter. Fluid passes through pipe 1—2 in the direction of the arrow. An orifice plate 3 having an opening 4 of smaller diameter than the pipe, is tightly fitted into pipe 1—2. In order to pass orifice 4, the fluid must increase its velocity above that in the approach pipe 1, and to produce this incrreased velocity there a pressure head will be established between pipe 1 where pressure is $P_1$ and pipe 2 where pressure is $P_2$. Pressure tap pipes 5 and 6 communicate pressure $P_1$ and $P_2$ to headers 7 and 8 respectively. Connected between headers 7 and 8 are three manometers 9, 10, 11. If a steady non-pulsating flow passes from pipe 1 through orifice 4 into pipe 2, the difference in pressure, or as it is commonly called, the "head", will be registered on the manometers 9, 10, 11. If the manometer fluid is water, the head will be expressed as the height of the column of water in the manometers in inches of water. From data covering the density of the fluid flowing in pipe 1—2, the size of the pipes, the size and character of orifice 4, and the head shown by the manometers, the velocity of the fluid flowing can be computed and from its velocity, the volume or weight per unit of time may be determined.

Manometer 9 is the conventional U tube, communicating freely to headers 7 and 8 and having an unobstructed flow of manometer fluid.

Manometer 10 is like 9 except that it has a gauge cock 14 through which the manometer fluid passes, or the cock may be above the water level and control the air or other fluid transmitting the pressures in pipes 1 and 2 to the surfaces of the water in the manometer. The purpose of cock 14 is to dampen the movement of the manometer fluid and to cause it to be retarded in adjusting to higher or lower values of head $h_{10}$.

My invention is embodied in manometer 11, which has, in place of gauge cock 14, a variable resistance device generally indicated by number 15 in Fig. 1, but shown in greater detail in one of its possible forms in Fig. 3. This variable resistance device will be referred to for simplicity as a "check valve". The check valve is preferably connected between the two legs 12 and 13 of manometer 11, but it may be introduced into any of the connections between the manometer fluid and the pressure taps 5 and 6. In Figs. 3 and 4, the reference 15 is employed to indicate the body of the check valve, 16 and 17 are gland nuts which, in connection with rubber gaskets 18, make a tight joint between body 15 and the legs 12 and 13 of manometer 11. Body 15 has an inner dividing wall 19 with a restricted opening 20 of smaller diameter than the internal diameter of tubes 12 and 13. A valve disc 21 of thin metal normally rests on seat 26 in body 15 by gravity. Valve disc 21 has a very small orifice 22 so disposed that the opening 22 is effective even when the valve disc is on its seat. Seat 26 is recessed to a diameter a little less than that of disc 21 so that pressure acting upward through opening 20 will act upon a large area of the underside of disc 21 and for the further purpose of insuring that orifice 22 cannot become closed or partly closed by failure to register exactly over opening 20. Valve disc 21 is of less diameter than chamber 27 of body 15, and is therefore free to rise from its seat 26 when the pressure beneath exceeds that above the valve disc. A ring 23 fitted into upper end of body 15 has downwardly projecting lugs 24 which restrict the rise of disc 21.

It is evident that flow from tube 12 to tube 13 must take place through restricted opening 22, but that if the tendency is to flow from tube 13 to tube 12, the valve disc will lift from its seat and allow the flow to pass with somewhat less restriction. If the lift area under disc 21, or the annular space between the outer diameter of 21 and the inner diameter of chamber 27 is of less effective area than opening 20, then the greatest restriction to upward flow will be determined by the area which has the least effective value. For simplicity, we will assume that opening 20 is the effective area restricting upward flow.

To correct for pulsating flow, I make opening 20 always greater than opening 22, and thereby permit fluid to adjust more easily from high to low heads than it does from low to high heads. The purpose of this will be more fully understood by reference to Figs. 1 and 2. Assume that the flow in pipe 1—2 is not uniform but varies periodically during similar cycles covering a very short interval of time T. Assume that the rate of flow during interval T averages unity, and that the orifice 4, etc., are so proportioned that this average unity flow, if constant and unvarying during interval T, would give unity head, for example one foot of water column. When uniform flow is established, manometers 9, 10 and 11 will all show this same head of one foot, the only difference being that the column of manometer fluid will adjust to the head more slowly in manometers 10 and 11 than it will in manometer 9. Now assume that the flow becomes non-uniform or pulsating, during cycle period T, in such manner that, during equal intervals of time $t_1$, $t_2$ and $t_3$, the relative flow in interval $t_1$ is 2.5, in interval $t_2$ flow is .5 and interval $t_3$ flow is zero. From the fundamental formula relating velocity or volume to head, it is evident that the instantaneous actual heads during these intervals will be, relatively, 6.25 during $t_1$, .25 during $t_2$, and 0 during $t_3$. From this the average flow V is unity and the average head H is 2.17. In other words, the average head, if it could be observed, would be 2.17 times as much as for the same average rate of flow over time T, if uniform. The apparent volume flowing, if computed from average head would be the square root of 2.17 or 1.47 as compared with the actual average volume 1. In other words, the results shown would be 47% too high.

It is evident that, the interval T being very short (usually only a fraction of a second in actual applications), it will be impossible for manometer 9 to follow the instantaneous changes in head and it could not be accurately observed if it did. It would appear that manometer 9 should show the average value of $h$, but as a matter of fact I have ascertained that it will give readings somewhat less than the average value of $h$ when the flow is widely pulsating, as in the example taken, while approaching more nearly to the average value of $h$ when the flow is only moderately pulsating.

To dampen the action of the manometer it is customary to use the equivalent of gauge cock 14, which can be adjusted down to give a restricted flow and cause the manometer to give a steady reading. This reading may be in some instances equal to the average head, and in other instances may vary somewhat from the average head. It may be shown mathematically, and I have verified experimentally that the head shown by a manometer 10 is equal to the average head in certain rates of variation in pulsating flow, but that it differs from the average head in most actual rates of variation encountered in practice. Even if such a manometer would give the average head, it would not be reliable for computing the volume flowing unless the exact character of the cycle of variation is known. If the manometer 11 fitted with check valve shown in Fig. 3, has openings 20 and 22 both sufficiently small to prevent rapid change in the indicated head $h_{11}$, and with the relative area of openings 20 and 22 in proper proportion, it is evident that the flow shown by Fig. 2 will give a reading $h_{11}$ equal to unity, the same as if the same volume flowed at a uniform rate during interval T. It is also evident that if the flow then becomes uniform while continuing at the same average rate, the valve disc 21 will remain on its seat, the opening 22 will permit slow adjustment of manometer level, but the reading $h_{11}$ will not be affected in any way, but will register the same as it previously did on the pulsating flow and the same as manometers 9 and 10 on the steady flow.

The theoretical quantitative relation of areas $A_{20}$ and $A_{22}$ may be determined as follows: Manometer 11 being assumed to show unity head $h_{11}$, during interval $t_1$, there is a differential head on the manometer fluid tending to make it pass downward through opening 22, this head being equal to $h_1 - h_{11}$ or $6.25 - 1 = 5.25$. During $t_2$ this head reverses and tends to make manometer fluid pass upward through orifice 20, the head so acting being $1 - .25 = .75$. During $t_3$ the differential head acting upward is $1 - 0 = 1$. $t_1$, $t_2$ and $t_3$ are equal, and the total quantity of manometer fluid passing upward equals that passing downward if $h_{11}$ is to remain the same at end of interval T as at the beginning. This gives the equation $$\sqrt{5.25} \times A_{22} = \sqrt{.75 + 1} \times A_{20} \text{ or } A_{22} = .578 \times A_{20}$$

or $A_{20}$ has an area 1.73 times as great as $A_{22}$.

Subject to certain practical limitations, I have found that the theoretical results as computed above correspond with actual experiments. If the flow through the orifices follows the hydraulic formula as above assumed, the resistivity of the orifices varies as the square of the velocity of the liquid flowing through them. The velocity varies inversely as the area, therefore the resistivity would vary inversely as the square of the areas, and the resistivity of orifice 22 would be the square of 1.73 or 3 times as great as that of orifice 20. I have found that to obtain proper compensation, the areas of the orifices must be large enough to permit a finite flow of liquid in the brief time interval available, but they must be small enough to offer a distinct resistance to flow in either direction. Furthermore, the orifices must differ from each other in resistivity in the proper ratio. For the nature of pulsating flow to which I contemplate applying my pulsating compensator, the resistivity of the orifices should have a ratio of the order of magnitude not exceeding four to one. This means, if the flow through the orifices follows the hydraulic formula, that the ratio of areas of the orifices would be of the order of magnitude not exceeding two to one. If each orifice consists of a single circular hole, the ratio of diameters would not exceed 1.5 to 1.

In demonstrating the performance of manometer 11, I have taken a very severe practical condition as indicated in Fig. 5 which represents a single cylinder, single acting air compressor with cylinder 30, piston 31, connecting rod 32, crank 33, inlet connection 34, outlet connection 35 and the usual other details of such machines, all of which are well known. The entire apparatus of Fig. 1 was connected to the intake of such a compressor by attaching pipe 2 of Fig. 1 to intake 34 of Fig. 5. The outlet 35 was connected by pipe 36 to a large reservoir 37 and the latter connected to atmosphere by pipes 38—39 of the same size as pipes 1—2, and having an orifice plate 40 with opening the same as 4 in orifice plate 3. An ordinary manometer 41 by-passes the orifice plate 40. The compressor is operated at low pressure, acting merely as a displacement pump to avoid any tendency to leakage. As reservoir 37 is large, the flow from it is practically unvarying in rate and the outlet orifice across which manometer 41 is connected, handles the same average volume as the inlet orifice 4 in intake pipe 2. On the down stroke of piston 31, air is drawn through orifice 4 (Fig. 1) at velocities proportional to the approximately harmonic motion of the piston, while during up-stroke of the piston flow ceases through orifice 4. This is an exceedingly pulsatory character of flow not successfully measured heretofore by any known type of flow meter. From a diagram similar to that of Fig. 2, I have plotted the instantaneous rates of flow and the corresponding heads during a time cycle T consisting of one revolution of the compressor, using subdivisions $t_1$, $t_2$, etc., corresponding to equal angular advances of the crank shaft. From this diagram it appears that the average head on orifice 4 would be 2.58 times as great as for the same volume flowing uniformly during time T, which is approximately the same as saying that the average head would be 2.58 times that shown by manometer 41. Manometer 41 showed a head of 7″ water column. 2.58 times this would be 18.06″, theoretical average for manometer 9. Actually manometer 9 fluctuated so badly it was impossible to read with any accuracy, but an approximate average observed height was 15″. Manometer 10, throttled to give fairly steady reading showed 10.2″; at other adjustments of cock 14 it would give readings anywhere from 10″ to 14″, showing that the readings of manometers 9 and 10 are equally without any rational meaning that could be correctly translated into a measure of the average rate of flow. Simultaneously, manometer 11 gave a reading of 7.1″, which being corrected for the slight difference in density of the air passing the two orifices, gives the same rate of flow as head of 7″ shown on manometer 41. Manometer 11 was then substituted in place of manometer 41 and gave the same reading (7″), proving that on a steady flow the reading is unaffected by check valve 15.

In practice, the variation in flow in such service as delivery from pumps, steam supply to reciprocating engines, etc., is of a more complex nature than that shown in Fig. 2, or that due to the arrangement in Fig. 5. It cannot be reliably determined by theory, and I prefer to analyze the character of the pulsations by means of an apparatus which I have devised for the purpose and which I term a "pulsatometer", illustrated in Figs. 6, 7 and 8. In these figures, 50 is a short cylinder, closed by heads 51 and 52, of which 51 is shown integral with the cylinder. A light weight piston 53 fits freely in the cylinder bore and the piston rod 54 passes out through both heads with a uniform diameter so as to cause no unbalance. I preferably use no stuffing boxes and make the piston rod a free fit where it passes through the cylinder heads. Ports 55 and 56 open into chambers 57 and 58 on opposite sides of the piston 53. Piston rod 54 is connected to lever 59 by pin 60. Lever 59 is preferably mounted on a flexible ligament or hinge 61 and is restrained in its movement by springs 62 and 63 with adjustable clamps 64 and 65 to permit regulating the tension. If openings 55 and 56 are connected to pressure taps 5 and 6 respectively of Fig. 1, and a pulsating flow occurs in pipe 1—2, the piston 53 will reciprocate through a short travel proportional to the instantaneous value of the head on opposite sides of orifice 4.

To multiply the travel of piston 53 and to obtain a record of the pulsating value of the head without introducing friction of the mechanism, I prefer to use an optical method of recording. Lever 59 has a small angular travel. On 59 I mount a mirror 69 and direct light upon it by source of light 67 and lens 68. Mirror 69 directs this concentrated light and focuses at a point 74. A sensitive film 70 is carried by spools 71 and 72 in a plane normal to the beam of light from mirror 69. Film 70 is arranged to travel from spool 71 to 72, or the reverse, at a uniform rate of speed by means of clockwork or other mechanism which I do not show in detail, as such devices are well known. The mechanism is enclosed in a light-tight casing 66 with partition 73 to prevent direct access of light to film 70. All of the parts inside the casing are finished dull black so that no light is reflected except that from mirror 69.

As piston 53 reciprocates and film 70 travels, mirror 69 will throw a spot of light on the film and trace a curve, the ordinates of which are proportional to the variations in head of the fluid on opposite sides of orifice 4. In Fig. 8, the curve $h$ covers one cycle of the pulsations. The base line B may be drawn before admitting pressures to cylinder 50, or by other methods which are obvious. From curve $h$, a curve $v$ may be drawn to a suitable scale so that the ordinates of $v$ vary as the square root of the ordinates of $h$. This may be done by computing and plotting points or by mechanical methods. Line H gives the mean value of $h$ and line V gives the mean value of $v$. From V and other known factors it is possible to compute the head which would be shown by the same volume with steady flow. By comparison with H, it is possible to compute proper relation of openings 20 and 22 of Fig. 3, for a check valve to be used in manometer 11 so that it will give readings the same as would be given by a steady flow of the same average value, or the proportion may be found by trial until manometer 11 gives readings equivalent to the computed head for steady flow. The same data may be used to determine the percentage or error that would be shown by an uncompensated manometer 9 or 10.

I do not limit my invention to the pulsatometer method of determining error in flow meters or for determining the proportions of the compensating device, but in many instances it is the only practicable method which can readily be applied.

In the above description, I have referred only to head meters using a fixed orifice and variable head. These are essentially manometers using a fluid such as water or mercury, and generally equipped with accessories for recording the apparent head and translating it into terms of volume or weight. Another important class of head meters employs an orifice of variable size and maintains, usually, a constant head. My method of correcting for pulsating flow applies equally to this type.

Thus Fig. 9 shows a meter which has no manometer, but in which the moving element consists of pistons 88 and 89 and piston rod 90 connecting them. The body 80 of this meter has inlet opening 81 and outlet 82, cover 83, sight glass 84 and yoke 85 holding sight glass in place and closing its upper end. Piston rod 90 moves inside of the sight glass and its position may be determined by observing divisions 102 on scale plate 101. A cylinder inside the body consists of two integral parts, 86 the orifice cylinder, and 87 the dash-pot cylinder, connected by webs with openings 92 to permit fluid to pass from inlet 81 to the inside of cylinder 86 in space marked $P_1$. This meter is more fully described in my patent on "Fluid meter", No. 1,238,498, issued August 28, 1917. In order to pass through the meter, air lifts the moving element until piston 88 uncovers enough holes 91 to permit the flow to take place at an average head which is fixed by the weight of the moving element and the area of piston 88, on which the difference of head acts to balance the weight. The position of piston 88 determines the total area of holes 91 exposed to the flow.

The flow under constant head is in direct proportion to the area of the orifice, and the position of top end of rod 90 as shown by scale divisions 102 is therefore a measure of the rate of flow. The above applies strictly to a steady flow.

If the flow is pulsating, another factor enters in. Piston 89 works in oil in dash-pot cylinder 87 so that if piston 88 moves up or down, oil is transposed from one side to the other of piston 89 through the annular space 97 between the piston and the wall of the cylinder. A definite average rate of flow will produce a higher average head if pulsating than if constant. Responding to this higher average, piston 88 will rise and indicate a greater rate of flow, unless restrained by dash-pot action. Piston 89 has a recess 93 with one or more holes 94 communicating with the oil below the piston. A disc valve 95 normally seated on piston 89 has an opening 96 of less size than holes 94. Disc 95 is restrained in its lift by pin 98. In the bottom of cylinder 87 is a ball check valve 100 permitting up flow of oil from oil supply 103 in the lower part of body 80, but preventing return flow through opening 99. The purpose of this is to keep cylinder 87 filled with oil. If piston 88 moves upward, oil will flow up through opening 99 and will flow down through openings 96 and 97, the total volume of oil transferred being equal to the displacement of piston 89. Call the combined effective area of these three leak areas $A_1$. If piston 88 moves downward, oil will flow upward through openings 94 and 97. Call this combined leakage area $A_2$. If, on a pulsating flow, piston 88 is to keep the same average position as it would on steady flow of the same average volume passing through the meter, the volume of oil flowing through area $A_1$ must equal that through area $A_2$. If $A_2$ exceeds $A_1$ by a sufficient amount, permitting piston 88 to adjust downward more easily than it moves upward, it will maintain a position corresponding to that for the same volume at steady flow. This may be quantitatively shown by calculations similar to those above indicated in connection with manometer 11 and the check valve of Fig. 3.

The net result of arrangement shown in Fig. 9 is to produce a greater average head on orifices 91 than that due to the weight of the moving element, this greater average head being applied by the dash-pot action, and being such that the pulsating flow can pass orifice 91 without the necessity of moving the piston upward. On steady flow, the disc 95 remains on its seat and the dash-pot has no effect on th head, except when the rate of flow in the meter changes. The meter will therefore measure correctly on a pulsating flow and, without change, will be correct on a steady flow.

In the application of my method to various other forms of meters, suitable modifications in structure may be made to meet the needs of the particular device. Modifications in detail will suggest themselves in connection with meters of the manometer type. For example, where mercury columns are used, the check valve 15 would naturally be inverted, as the disc of metal 21 of Fig. 3 would be buoyant in mercury and the action of gravity would therefore be upward instead of downward.

No claim is made in this application to the specific form of liquid manometer shown in Figs. 1, 3, 4 and 5, the subject matter of which being claimed in my copending application Ser. No. 704,243, filed April 4, 1924.

I claim—

1. A pulsation compensated flow meter comprising a movable element actuated by head and subject to the pulsating head of the metered fluid, means retarding said moving element in both directions, the degree of retardation being greater in one direction than in the other but in definite relation thereto, said retarding means comprising a liquid valve device having a displaceable valve member which affords, when seated, a port opening of less area than the port opening when the valve is unseated, the port of less area being effective when the movement of the movable element is induced by the head of the metered fluid.

2. The method of metering a fluid having a pulsating flow, which comprises causing said fluid to energize a movable meter element, comprising a liquid resistance, and permitting displacement of said resistant liquid, during constant average flow of the metered fluid, only in substantially equal amounts during opposite pulsation efforts of the metered fluid.

3. The method of measuring the rate of fluid flow which consists in establishing a differential head in the fluid, registering the flow by head-actuated means, and providing resistances to the head-actuated means, said resistances being effective only when the flow varies and the relative resistivity of said resistances differing in the ratio of the order of magnitude not exceeding 4 to 1.

4. A pulsation compensated flow meter comprising a movable element subject to the pulsating head of the metered fluid, and means damping unequally the movement of said element in opposite directions, said means comprising a liquid valve device having port openings, the relative areas of which have a ratio not exceeding 2 to 1, only the port opening of less area being effective when the movement of the movable element is induced by the head of the metered fluid.

5. A pulsation compensated flow meter comprising a movable element subject to the pulsating head of the metered fluid, and means damping unequally the movement of said element in opposite directions, said means comprising a liquid valve device having port openings, the relative areas of which have a ratio not exceeding 2 to 1, and a light plate valve restricting the port openings to the area of less extent when the movement of the movable element is induced by the head of the metered fluid.

In testimony whereof I have signed my name to this specification.

CLARENCE A. DAWLEY.